United States Patent
Frey et al.

(10) Patent No.: US 8,719,912 B2
(45) Date of Patent: May 6, 2014

(54) ENABLING PRIVATE DATA FEED

(75) Inventors: Anthony Frey, Redmond, WA (US);
John Bruno, Snoqualmie, WA (US);
Benjamin Walters, Seattle, WA (US);
Charles Bassett, Seattle, WA (US);
Jacob Dong Ju Kim, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1229 days.

(21) Appl. No.: 12/147,511

(22) Filed: Jun. 27, 2008

(65) Prior Publication Data

US 2009/0328177 A1   Dec. 31, 2009

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| H04L 9/32 | (2006.01) | |

(52) U.S. Cl.
USPC ............. 726/10; 713/156; 713/157; 713/158; 713/175

(58) Field of Classification Search
USPC .................. 713/168, 156–158, 175; 726/10
See application file for complete search history.

(56) References Cited

U.S. PATENT DOCUMENTS

| | | | |
|---|---|---|---|
| 6,105,027 A | | 8/2000 | Schneider et al. |
| 6,314,425 B1 * | | 11/2001 | Serbinis et al. ........................ 1/1 |
| 6,360,254 B1 | | 3/2002 | Linden et al. |
| 6,434,561 B1 | | 8/2002 | Durst, Jr. et al. |
| 7,178,031 B1 | | 2/2007 | Seger |
| 7,398,557 B2 * | | 7/2008 | de Jong ............................ 726/29 |
| 7,400,732 B2 * | | 7/2008 | Staddon et al. ................ 380/278 |
| 8,566,462 B2 * | | 10/2013 | Jun et al. ........................ 709/229 |
| 2003/0196087 A1 * | | 10/2003 | Stringer et al. ................ 713/171 |
| 2005/0097190 A1 | | 5/2005 | Abdelhak |
| 2005/0177390 A1 | | 8/2005 | Young et al. |
| 2006/0028691 A1 * | | 2/2006 | Shinomiya .................... 358/402 |
| 2006/0173985 A1 | | 8/2006 | Moore |
| 2006/0212706 A1 * | | 9/2006 | Jiang et al. .................... 713/176 |

(Continued)

OTHER PUBLICATIONS

"Authenticated and private feeds" (Retrieved Apr. 18, 2008) http://www.niallkennedy.com/blog/2006/09/authenticated-private-feeds.html.

(Continued)

Primary Examiner — Kambiz Zand
Assistant Examiner — Feliciano Mejia
(74) Attorney, Agent, or Firm — Bryan Webster; Andrew Sanders; Micky Minhas (57) ABSTRACT

A method of generating a pre-authenticated link to access a private feed and providing access to the private feed using the pre-authenticated link. A request to access the private feed is received and a first user sending the request is authenticated. A token for the first user is generated when the first user is authorized to access the private feed. The token may identify the first user, the private feed and an owner of the private feed. The token may be embedded within a link and transmitted to the first user. A user is automatically authorized to access the private feed when the token is sent by the user using the link. The link automatically authenticates the first user and allows access to the private feed. The private feed may become inaccessible to the first user when the owner of the private feed revokes access of the first user.

20 Claims, 5 Drawing Sheets

(56) References Cited

U.S. PATENT DOCUMENTS

2007/0094390 A1   4/2007  Nussey
2007/0156692 A1   7/2007  Rosewarne
2007/0174209 A1   7/2007  Fallon et al.
2007/0219910 A1*  9/2007  Martinez ......................... 705/51
2008/0019527 A1*  1/2008  Youn et al. .................... 380/278
2008/0052343 A1   2/2008  Wood
2008/0140720 A1*  6/2008  Six et al. ..................... 707/104.1

OTHER PUBLICATIONS

"SSH & HTTP Authentication" (Retrieved Apr. 18, 2008) http://blog.charlvn.za.net/2006/09/ssh-http-authentication.html.

* cited by examiner

ENABLING PRIVATE DATA FEED

BACKGROUND

The widespread use and increasing development of the Internet has allowed exchanges of information in ways previously not possible. For example, the Internet has allowed social networking to now be made available online. Users can now publish information, e.g., their name, school, metropolitan groups, events, activities, interests, pictures, etc. For example, users may now publish their recent pictures from their last vacation to a particular photo sharing web site. Users may enable data feeds for the activities they have published online. Data feeds allow custom applications to read and interact with that data.

Data feed is generally referred to as a content aggregation technology that enables online users to read and aggregate public content in a standard format. The standard format may include really simply syndication (RSS) and ATOM. Unfortunately, a public data feed, e.g., conventional RSS and ATOM, generally does not enable a user to selectively control publication of private information. For example, a public data feed does not have the ability to enforce access control to a particular group of people. As a result, data feeds in general expose data that are only publicly available.

Moreover, conventional standard protocols are unable to authenticate a user against the services that provide data feeds. In other words, conventional standard formats are public. Thus, users are provided with very limited control for publishing data and content because of lack of open authentication standard and inability to authenticate and authorize users. As a result, private data is virtually inaccessible by feed readers due to lack of open authentication standards. Moreover, users have very limited control over selectively publishing private information.

Some conventional methods may facilitate a basic authentication form with some limitations. For example, a user may provide a username and a password in order to be authenticated. Unfortunately, authentication by requiring the user to enter a username and a password each time that the user wishes to access private data is not only manual but also laborious and redundant since the user that has already been properly authenticated should be able to access the same data without repeating the same process. Moreover, authentication mechanisms supported by feed clients are not secure since usernames and passwords are transmitted in plain text over the server, thereby increasing the security risk to a user account.

Furthermore, the basic authentication described above is nontransferable between devices and is thereby limited to one device. For example, a user utilizing a laptop may be required to enter a username and a password if the user wishes to access private information, e.g., pictures from a recent trip. However, the user may also be required to enter the username and the password again for accessing the same information using a different device, e.g., electronic picture frame. Thus, the basic authentication is nontransferable between devices.

Generally, when a user logs out, the private information becomes inaccessible to that user. Unfortunately, requiring the user to be constantly logged on in order to access private information is not only inconvenient but it poses an account security risk. For example, a user is required to be logged on if the user wishes to display pictures that need authentication on an electronic picture frame. Moreover, a picture frame feed reader does not provide a mechanism by which to provide authentication to a data service. As a result, the user's account is exposed to public since the user remains logged on for displaying pictures.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A need has arisen to enable an owner of data feed to selectively control publication of private information via private feed. Furthermore, a need has arisen to enable subsequent authentication of a user of private feed to be performed automatically without requiring the user to manually re-enter the authentication information. Additionally, there is a need to be able to transfer authentication of a user between various devices. It would also be advantageous to render private feed accessible to the authenticated user once the user is logged off.

In one embodiment, a user requests to access private feed. A token is generated if the user is properly authenticated. The token may identify the authorized user, the private feed, the owner of the private feed and the expiration of the authorization. A link is generated, embedding the token and transmitted to the user for providing access to the private feed without requiring the user to re-enter authentication information. The link may be parsed and the token is retrieved when the user sends the link back to the server. The token identifies the authorized user, the private feed and the owner of the private feed. The private feed is provided if the user is determined to be an authorized user.

As such, techniques described herein provide a way for generating a pre-authenticated link for an authorized user. Moreover, the pre-authenticated link may be used in order to access the private feed from various devices without requiring the user to re-enter the authentication information. Furthermore, the pre-authenticated link enables the user to access the private feed offline, e.g., when the user has logged out, thereby enhancing account security.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Reference will now be made in detail to the embodiments of the claimed subject matter, examples of which are illustrated in the accompanying drawings. While the invention will be described in conjunction with the embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail so as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or "sending" or "extending" or "storing" or "rendering" or "authenticating" or "tailoring" or "embedding" or "encrypting" or "decrypting" or "rendering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Overview

In one embodiment, a user requests to access private feed. A token is generated if the user is properly authenticated. The token may identify the authorized user, the private feed and the owner of the private feed. A link is generated, embedding the token and transmitted to the user for providing access to the private feed without requiring the user to re-enter authentication information. For example, the link may be a uniform resource locator (URL). The link may be parsed and the token is retrieved when the user sends the link back to the server. The token identifies the authorized user, the private feed and the owner of the private feed. The private feed is provided if the user is determined to be an authorized user.

It is appreciated that the token may be created using a key that may belong to the owner of the private feed. The key may define a group of authorized users for accessing the private feed. The key may be unique to the owner of the private feed as well as to a subset of owners of the private feed. Altering the key can change accessibility of the private feed. When the key is revoked or changes, all outstanding links to associated data feed may be revoked, thereby invalidated. For example, a user that was previously authenticated and authorized to access the private feed may no longer be authorized by changing the key. As a result, accessibility of the private feed to a user may be revoked by the owner of the private feed if the key is altered and the user is removed from an authorized group of people that should have access to the private feed. Thus, when the link is received and the token is retrieved, the authorized user as identified by the token may be compared to the authorized users as identified by the key. Access to the private feed may be denied if the authorized user identified by the token is not within the group of authorized users as identified by the key. Thus, access to the private feed may be revoked and denied.

It is further appreciated that since the viewer's credentials may be embedded within the token, it is possible for the owner of the private feed to change permissions for the private feed for a viewer or a set of viewers. For example, in social networking sites, the private feed owner may limit the access to a given set of information to a subset of user friends and networks. It is appreciated that these permissions may be independent from key revocation mechanism described above. As a result, the user may still have access to the private feed information but be restricted to access certain portions of the private feed that were previously available.

Example System

Figure 1:
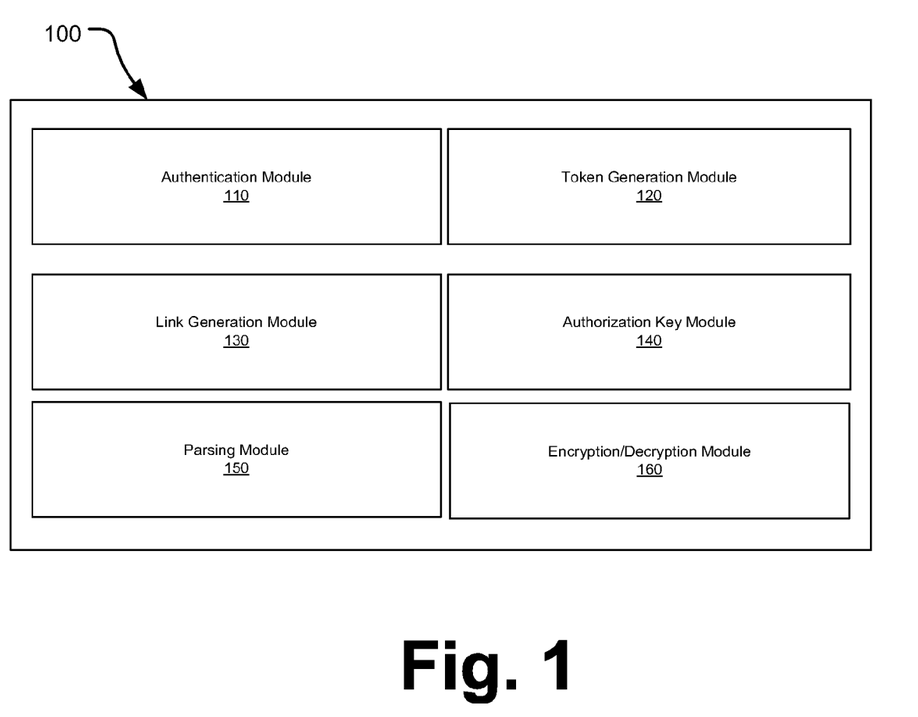
FIG. 1 shows a block diagram of an exemplary system for generating a pre-authenticated link to access private feed, in accordance with an embodiment.

The following discussion sets forth details of the present technology systems for network communication management. FIG. 1 illustrates example components used by various embodiments of the present technology. Block diagram 100 includes components or modules that, in various embodiments, are carried out by a processor under the control of computer-readable and computer-executable instructions. The computer-readable and computer-executable instructions reside, for example, in data storage features such as computer usable memory, removable storage, and/or non-removable storage.

FIG. 1 shows a block diagram 100 of an exemplary system for generating a pre-authenticated link to access private feed, in accordance with an embodiment. The block diagram 100 may comprise an authentication module 110, a token generation module 120, a link generation module 130, an authorization key module 140, a parsing module 150 and an encryption/decryption module 160.

In one embodiment, a content owner may wish to control publication of that content. For example, the owner may wish to publish private information only to those within a specific social circle, e.g., family members, coworkers, best friends, classmates, subscribers that have paid, etc. The information that the owner may wish to selectively publish may be referred to as private feed and may comprise contents such as pictures from a recent trip, contact information for people within a specific group, invitation to a specific event, a video clip, an audio file, etc.

According to one embodiment, a key that may belong to the owner of private feed may be used to control the publication of the private feed to individuals as specified by the owner. For example, the owner of an electronic family album may wish to provide the immediate family members access to the family album online. As such, the key that may belong to the owner of the private feed may correspond to the immediate family members to provide access to the family album. The key may be stored in the authorization key module 140. In one embodiment, the key is an 8-byte key that may be additionally used to turn the private feed on and off.

A user, e.g., an immediate family member, may wish to access the private feed, e.g., family album, by sending a request to access the private feed. In response to receiving the request, the server may authenticate the user. For example, the user may be authenticated via the authentication module 110 of the server to ensure that the user belongs to an authorized group of people, e.g., the immediate family members, for accessing the private feed, e.g., family album. In one embodiment, the user is authenticated using a username and a password. However, it is appreciated that other means may be employed for authenticating the user and determining whether the user is authorized to access the private feed.

The private feed may be provided to the user when the user is authenticated and determined to be authorized to access the private feed. On the other hand, access to the private feed may be denied if the user is determined to be unauthorized.

A token is generated using a token generation module 120 when the user is authenticated and determined to belong to an authorized group of people for accessing the private feed. In one embodiment, the token identifies the user. It is appreciated that the token may further identify the owner of the private feed along with the private feed. In other words, a token is an association of private feed with a particular authenticated user. The token may be a plain text. According to one embodiment, a portion of the token may be encrypted. Thus, the generated token may be sent to the encryption/decryption module 160 for encryption. However, it is appreciated that the entire token may be encrypted. It is further appreciated that the encryption key may be related to the key from the authorization key module 140.

The link generation module 130 may generate a link for accessing the private feed. The link may embed the generated token. In one embodiment, the link may identify the owner of the private feed. Moreover, the link may identify the location of the private feed. According to one exemplary embodiment, the link may identify the data as public for public feed and as private for private feed. It is appreciated that the link may further identify the format of the generic reader, e.g., really simple syndication (RSS), ATOM, etc. For example, at the end of the link there may be an indication of the format of the generic reader. In one exemplary embodiment, the format of the generic reader may be identified when the user request access to the private feed. The generated link may be in compliance with uniform resource locator (URL) format. However, it is appreciated that other formats may be used. As such, the use of URL format is exemplary and should not be construed as limiting the scope of the embodiments.

The generated link may be transmitted to the user. The link is a pre-authenticated link and may be used to authenticate the user without requiring the user to re-enter the authentication information. As a result, the user may subsequently send a request back to the server in order to access the private feed. For example, the user may wish to work offline, e.g., when a user has logged off, but still have access to the private feed by sending the generated link to the server. In other words, the user may send the link after logging off. The link is then used by the authentication module 110 to authenticate the user and to determine that the user is authorized to access the private feed. Once authenticated, the private feed may be made available to the user. However, it is appreciated that a user different from the original user may also be given access to the private feed as long as the generated link is used and as long as the original authenticated user remains authorized to access the private feed.

Once the link is received, the parsing module 150 may parse the link. Accordingly, the owner of the private feed, the location of the private feed, the token, the format of the reader being used, etc., may be determined. Once the token is retrieved, the encryption portion of the token may be decrypted using the encryption/decryption module 160. In one embodiment, the decryption key may be related to the key stored in the authorization key module 140. Decrypting the token may further reveal the owner of the private feed, the private feed and the originally authenticated user.

In one embodiment, the private feed is made available when the user identified by the token is an authorized user according to the owner of the private feed. For example, the authorized user identified by the token may be compared to that identified by the key stored in the authorization key module 140. As such, the private feed may be made available when there is a match and access to the private feed may be denied when there is a mismatch.

It is appreciated that the owner of the private feed may revoke accessibility of an authenticated user from accessing the private feed. For example, the owner of the private feed may wish to remove a sibling from the immediate family members that have access to the family album online. Thus, the key stored in the authorization key module 140 may be altered by the owner of the private feed. As a result, access may be denied to the sibling that was authenticated and was authorized to access the private feed at the time that the link was generated. Thus, sibling's access to the private feed may be revoked.

In one exemplary embodiment, the token parsed out from the received link may be compared to the key stored in the authorization key module 140. For example, the token identifies the authenticated user as an authorized user, however, that authorized user has been removed from the list of authorized user by altering the key stored in the authorization key module 140. Thus, the comparison results in a mismatch, thereby denying the user from accessing the private feed.

As a result, the user may utilize that link in order to access the private feed without having to re-enter the authentication information. Moreover, the user may provide the link from a first device, e.g., a laptop, to a second device, e.g., picture frame, such that the second device can be given access to the private feed without the need to re-enter the authentication information by the second device. In other words, the link pre-authenticates the user such that private feed is available via the link. As such, the private feed is now accessible even when the user wishes to access the private feed after logging out.

Figure 2:
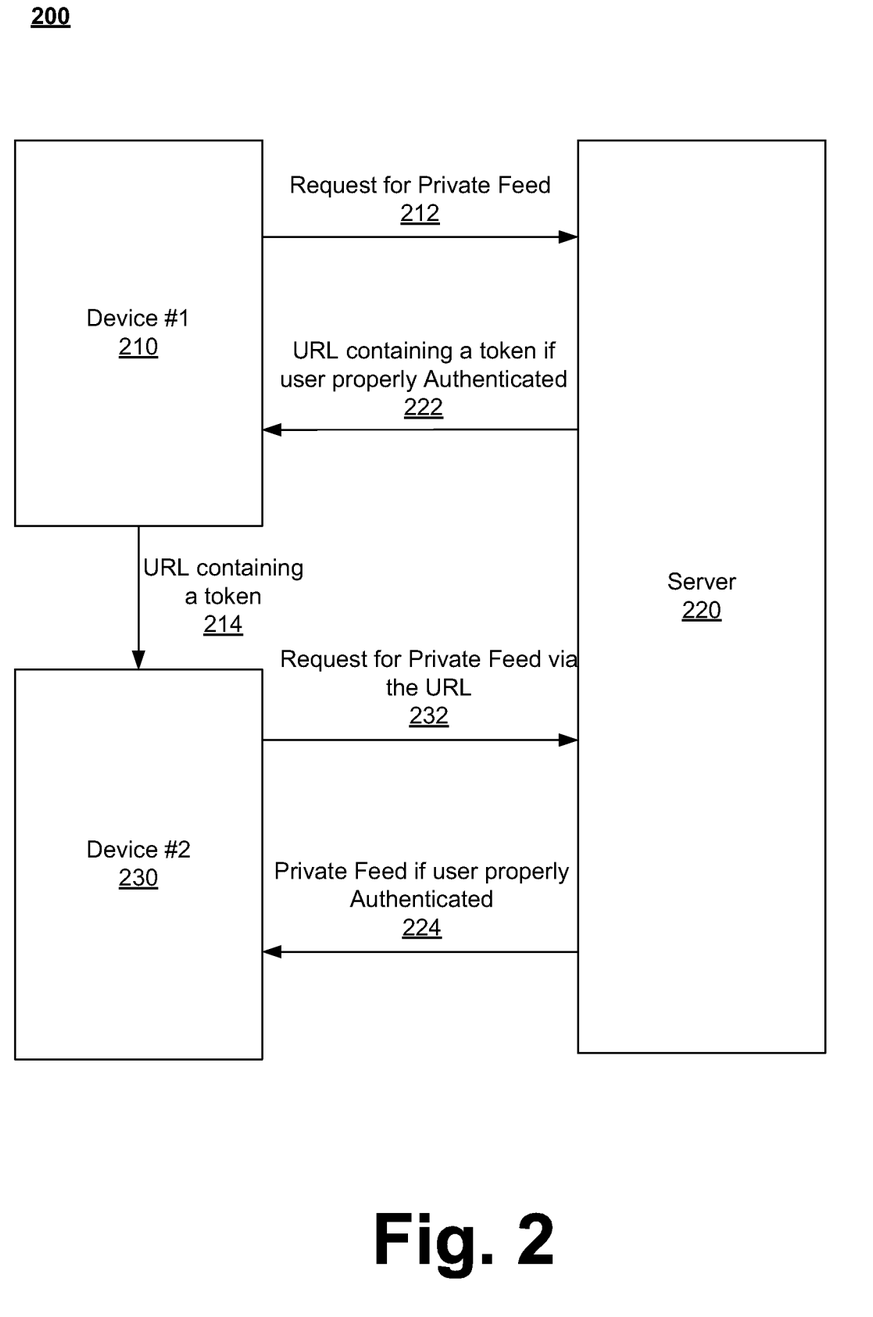
FIG. 2 shows an exemplary illustration of data flow between users and a server generating a pre-authenticated link to access private feed, in accordance with an embodiment.

FIG. 2 shows an exemplary illustration of data flow 200 between users and a server generating a pre-authenticated link to access private feed, in accordance with an embodiment. A request 212 to access private feed may be sent from a first device 210 to the server 220. The request 212 may be accompanied with authentication information, e.g., a username and a password. Thus, the user requesting access to the private feed may be authenticated. For example, the authentication module 110 may be used to authenticate the user and to determine whether the request is from a user authorized to access private feed. The private feed may be provided to the user for rendering if the user is determined to be an authorized user to access the private feed.

The server 220 may use the token generation module 120 to generate a token if the user is identified as an authorized user to access the private feed. For example, the stored key in the authorization key module 140 may be used to determine whether the user belongs to a group authorized to access the private feed as determined by the owner of the private feed. The token may identify the authorized user, the private feed and the owner of the private feed. In one embodiment, the token is generated partly based on the key stored in the authorization key module 140. A portion of the token may be encrypted. A link may embed the token, where the link is in compliance with the URL format. The link may further identify the owner of the private feed, the location of the private feed, etc. The URL that contains the token may be transmitted 222 to the first device 210. As such, the URL may be subsequently used by the first device 210 or any device to access the private feed.

An exemplary URL link may be http://cid-(userid).private-.feeds.live.com/users(userid)/blogs(blogid)/?at=<token>&format=rss. The "userid" may identify the owner of the private feed. "Private.feeds" may identify that the feed is private and not public. "live.com" may identify the content provider for that private feed. "blogs" may identify the type of content being used as the private feed. The "token" is the generated token that may be partially encrypted and the "format" indicates the format of generic reader being used, e.g., RSS, ATOM, etc.

It is appreciated that the URL may be used by a device other than the first device 210 to access the private feed, e.g., a second device 230. For example, the received URL may be transmitted 214 to the second device 230. It is further appreciated that the user of the first device 210 may be the same as the user of the second device 230 or alternatively the user of the two devices may be different.

The URL link may be sent 232 to the server 220 in order to access the private feed. The exemplary embodiment illustrates the request for the private feed being sent from the second device 230. However, it is appreciated that the first device 210 may also send the URL link. As such, the second device sending the link to request for the private feed is exemplary and should not be construed as limiting the scope of various embodiments.

The server may parse the received URL link 232 using the parser module 150. As such, the server 220 may identify that owner of the content and that the content is private feed. Moreover, the server 220 may determine that the content provider is "live.com," and that the feed is a "blog." Parsing the URL link enables the server 220 to retrieve the previously generated token. The token is decrypted using the encryption/decryption module 160 if the token was encrypted by the server when the link was sent to the first device 210.

The token further identifies the original user that was authenticated at the time that the link was generated, the owner of the private feed and the private feed being requested. The server 220 may then determine whether the original user that was previously authenticated is still authorized to access the private feed. As such, access to the private feed is granted or denied accordingly. If the access to private feed is granted, the private feed may be provided 224 to the second device 230 for rendering.

It is appreciated that in one embodiment, the original user that was previously authenticated as identified by the token may be compared to a list of authorized user as indicated by the key stored in the authorization key module 140. As such, access to the private feed is granted if the original user that was previously authenticated is found in the list according to the key stored in the authentication key module 140. Otherwise, access to the private feed may be denied.

Accordingly, after the link is generated and transmitted 222, the owner of the private feed may revoke access to the private feed by altering the key stored in the authorization key module 140. For example, the key stored in the authorization key module 140 is altered when the owner of the private feed removes the user previously authorized to access the private feed from the list of authorized users. As a result, when the link is used to access the private feed, the previously authorized user according to the token within the link would no longer be authorized according to the new list of authorized users in accordance with the key stored in the authorization key module 140. As such, access to the private feed for a previously authorized user may be revoked.

It is appreciated that since the viewer's credentials may be embedded within the token, it is possible for the owner of the private feed to change permissions for the private feed for a viewer or a set of viewers. For example, in social networking sites, the private feed owner may limit the access to a given set of information to a subset of user friends and networks. It is appreciated that these permissions may be independent from key revocation mechanism described above. As a result, the user may still have access to the private feed information but be restricted to access certain portions of the private feed that were previously available.

Example Operations

Figure 3:
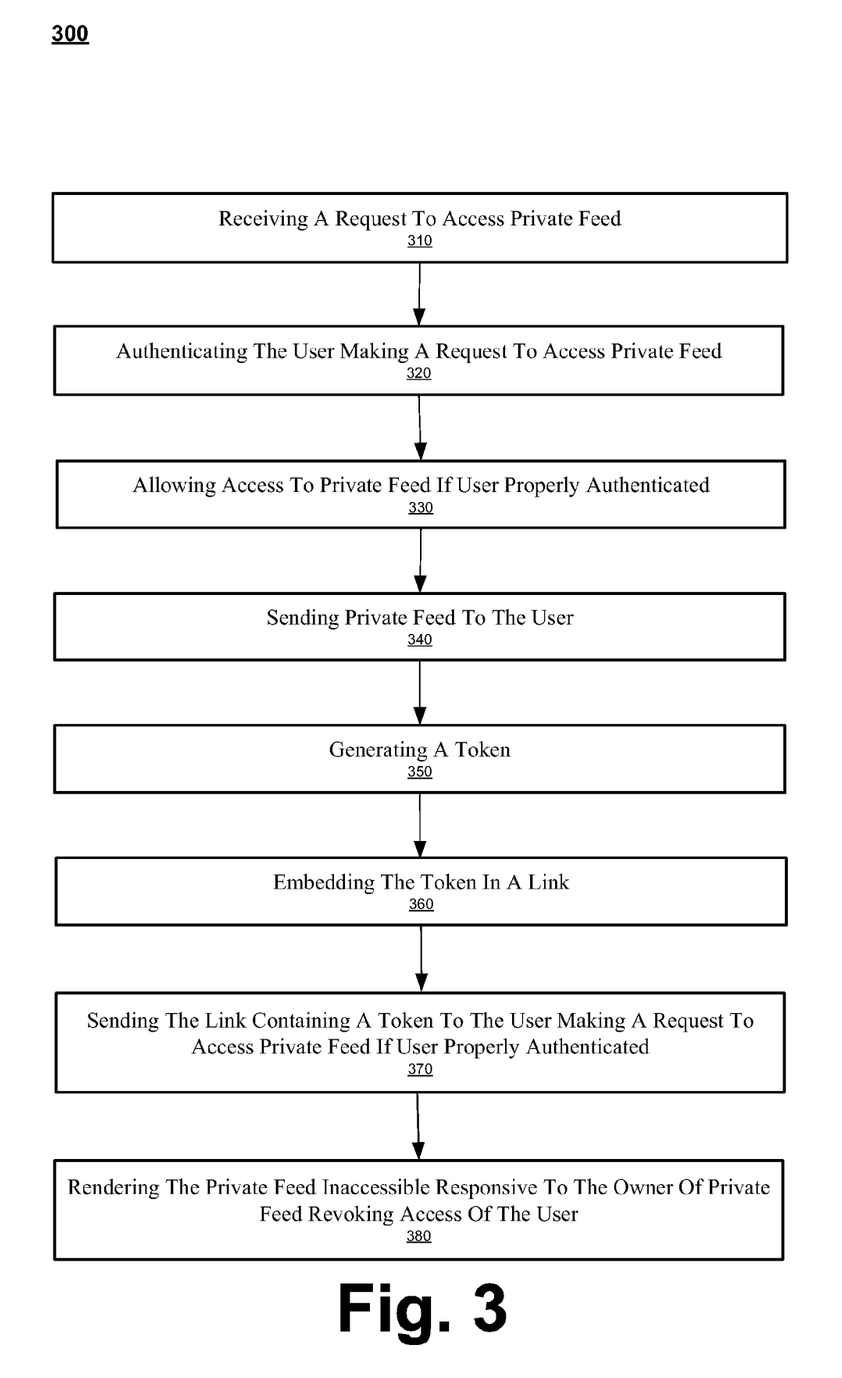
FIG. 3 shows a flowchart of an exemplary process for generating a pre-authenticated link to access private feed, in accordance with an embodiment.
Figure 4:
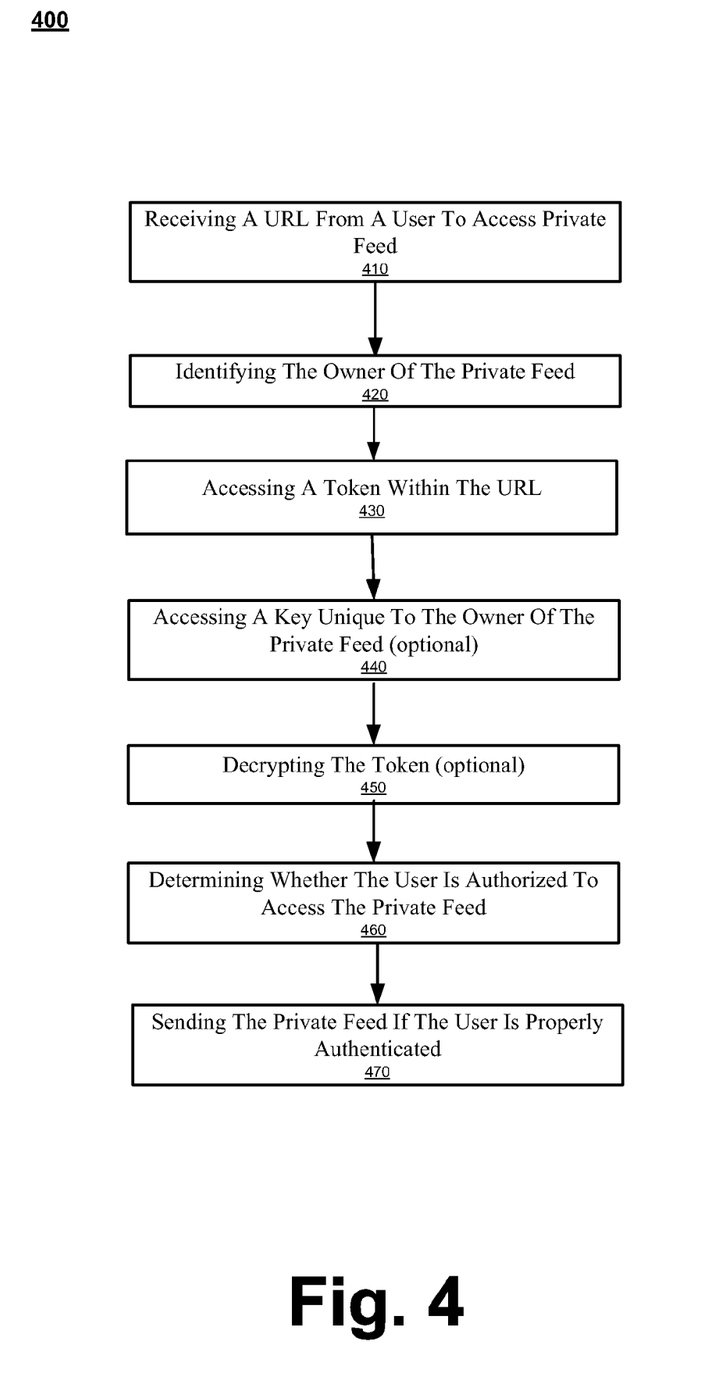
FIG. 4 shows a flowchart of an exemplary process for providing a user access to private feed, in accordance with an embodiment.

The following discussion sets forth in detail the operations of the present technology for content management. With reference to FIGS. 3 and 4, flowcharts 300 and 400 each illustrate example blocks used by various embodiments of the present technology. Flowcharts 300 and 400 include processes that, in various embodiments, are carried out by a processor under the control of computer-readable and computer-executable instructions. The computer-readable and computer-executable instructions reside, for example, in data storage features such as computer usable memory, removable storage, and/or non-removable storage.

FIG. 3 shows a flowchart 300 of an exemplary process for generating a pre-authenticated link to access private feed, in accordance with an embodiment. At step 310, a request to access private feed may be received. At step 320, the user making a request to access the private feed may be authenticated, e.g., by using a username and a password. At step 330, the user may be allowed access to the private feed if the user is properly authenticated. As such, at step 340 the private feed may be transmitted and sent to the user for rendering.

At step 350, a token may be generated. A token is generated if the user is authenticated and determined to be authorized to access the private feed. The token may identify the authenticated user at the time of generating the token, the private feed and the owner of the private feed. It is appreciated that the token may identify a given user. It is further appreciated that the token may be partly text and partly encrypted. In one embodiment, the token is generated partly based on the key stored in the authorization key module 140. The stored key may identify a group of authorized users to access the private feed. It is appreciated that the stored key is associated with the owner of the private key and may be for the owner.

At step 360, the token is embedded within a link, e.g., a URL. The link may identify the format of generic reader being used for rendering, e.g., RSS, ATOM, etc. At step 370, the link may be transmitted and sent to the authenticated user that has made the request to access the private feed. The generated link may be operable to automatically authenticate the authorized user. For example, the link enables access to the private feed as long as the original user that has been previously authenticated remains authorized to access the private feed.

It is appreciated that the access to the private feed may be granted to any user that sends the link as long as the authenticated user as identified by the token remains authorized to access the private feed. Thus, the link may be transferred from one device to another device by an authorized user to grant access to the private feed. Moreover, the link may be given away to a user different from that of the original user in order to grant access to the private feed.

At step 380, the private feed is rendered inaccessible to the user sending the link when the owner of the private feed has revoked authorization access of the authenticated user identified by the token. For example, a previously authorized user sending the link to access the private feed may be denied access if the owner of the private feed has removed the previously authorized user from a list of authorized users. It is appreciated that access may be changed by altering the key stored in the authorization key module 140.

On the other hand, accessing the private feed using the link remains in tact as long as the previously authenticated user remains authorized to access the private feed. In other words, any user may access the private feed by using the link as long as the owner of the private feed has not revoke accessibility of the private feed to the authenticated user.

As a result, the owner of the private feed may selectively control accessibility of the private feed. Moreover, users may access the private feed without the need to re-enter authentication information as long as the link is used and as long as the authenticated user remains authorized to access the private feed. In other words, the link pre-authenticates the user such that private feed is available via the link. As such, the private feed is now accessible even when the user wishes to access the private feed after logging out.

FIG. 4 shows a flowchart 400 of an exemplary process for providing a user access to private feed, in accordance with an embodiment. At step 410, a link, e.g., URL, is received from a user to access the private feed. It is appreciated that the user sending the link may be the same or a different user from the previously authenticated user. For example, the user that was previously authenticated may provide the pre-authenticated link to another user to access the private feed.

At step 420, the owner of the private feed is identified by using the link. It is appreciated that the link may be parsed. Accordingly, at step 430, the token within the link may be accessed. At step 440, the key stored in the authorization key module 140 may be optionally accessed. As discussed above, the key may belong to the owner of the private feed. At step 450, the token may optionally be decrypted if the token is an encrypted token. It is appreciated that the token may be partially encrypted. It is further appreciated that the decryption may be partly based on the key stored in the authorization key module 140. The token may identify the previously authenticated user that was authorized to use the private feed. The token may further identify the owner of the private feed and the location of the private feed.

At step 460, it is determined whether the identified user that was previously authenticated in the token is still authorized to access the private feed. For example, the stored key in the authentication key module may be used along with the token itself to determine whether the previously authenticated user is still authorized to access the private feed. In one exemplary embodiment, the stored key identifies a list of authorized users to access the private feed. Comparing the list of authorized users to the identified authenticated user in the token results in either a match or a mismatch. The owner of the private feed has revoked access to the private feed for the authenticated user of the token if there is a mismatch.

For example, a previously authorized user sending the link to access the private feed may be denied access if the owner of the private feed has removed the previously authorized user from a list of authorized users. It is appreciated that access may be changed by altering the key stored in the authorization key module 140.

On the other hand, accessing the private feed using the link remains in tact as long as the authenticated user according to the token remains authorized to access the private feed. In other words, any user may access the private feed by using the link as long as the owner of the private feed has not revoke accessibility of the private feed.

At step 470, the private feed may be transmitted to the user if the authenticated user identified in the token remains authorized to access the private feed. As such, the private feed may be transmitted to the user for rendering.

As a result, the owner of the private feed may selectively control accessibility of the private feed. Moreover, users may access the private feed without the need to re-enter authentication information as long as the link is used and as long as the authenticated user remains authorized to access the private feed. In other words, the link pre-authenticates the user such that private feed is available via the link. As such, the private feed is now accessible even when the user wishes to access the private feed after logging out.

Example Operating Environments

Figure 5:
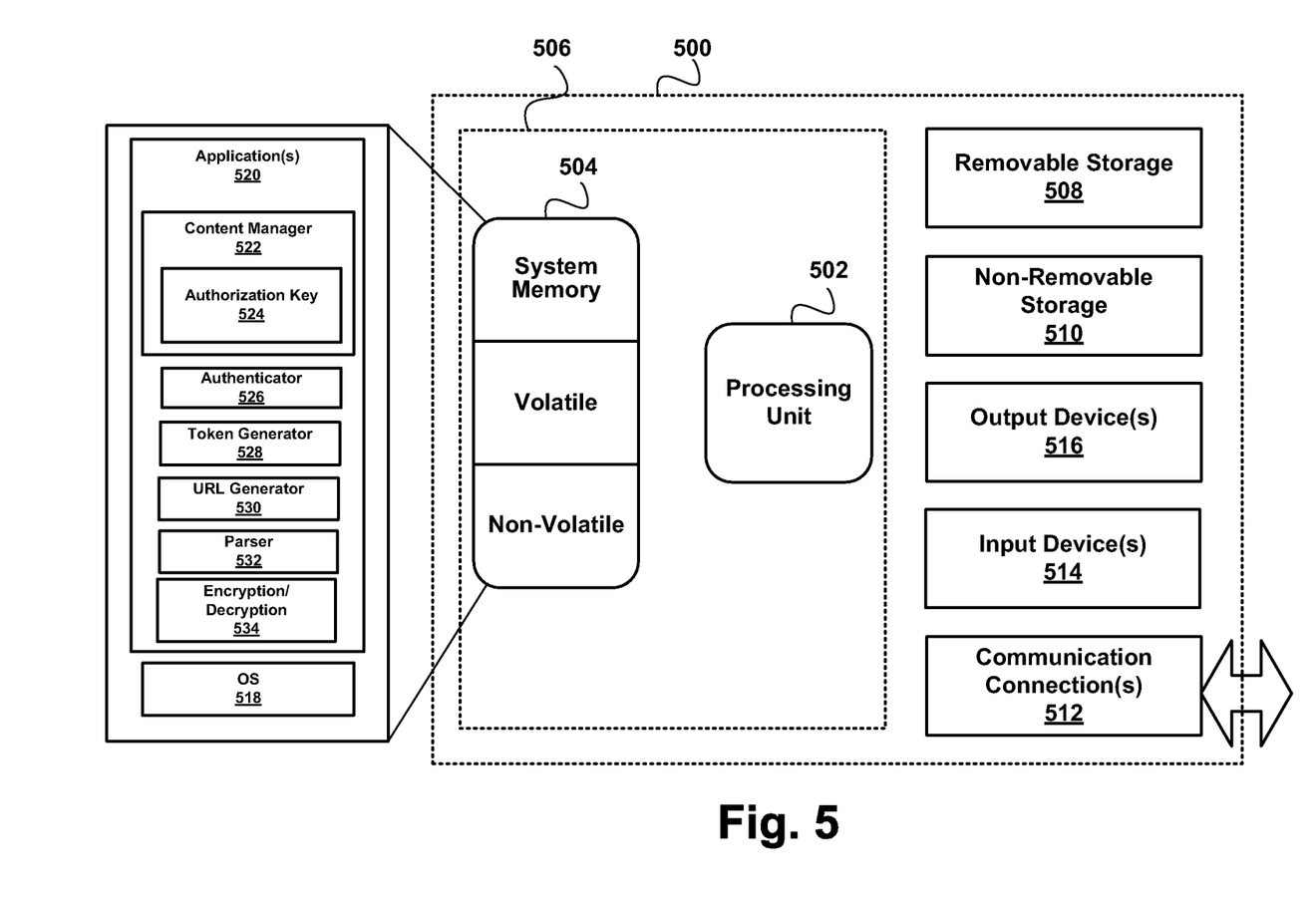
FIG. 5 shows a block diagram of an exemplary computing system environment for implementing an embodiment.

With reference to FIG. 5, an exemplary system for implementing embodiments includes a general purpose computing system environment, such as computing system environment 500. Computing system environment 500 may include, but is not limited to, servers, desktop computers, laptops, tablet PCs, mobile devices, and smartphones. In a basic configuration, computing system environment 500 typically includes at least one processing unit 502 and memory 504. Depending on the exact configuration and type of computing system environment, memory 504 may be volatile (such as RAM), non-volatile (such as ROM, flash memory, etc.) or some combination of the two. This basic configuration is illustrated in FIG. 5 by dashed line 506.

System memory 504 may include, among other things, Operating System 518 (OS), application(s) 520, and content manager 522. Content manager 522 may facilitate management of content that is public, limited access, and private, e.g., a website, a family photo album, financial documents, achievements in a video game, etc. Content manager 522 may further include authorization key 524 which is a key that belongs to the owner of the private feed. The authorization key 524 may represent which users are authorized which content and which private feed. An authenticator 526 is operable to authenticate the user. For example, the authenticator 526 may determine whether a user is authorized to access the private feed. A token generation 528 generates a token for authenticated user. The token may identify the authorized user, the owner of the private feed and the private feed. A URL generator 530 is operable to generate a link and embed the generated token within the generated link. A portion of the link, e.g., the token, or a portion of the token may be encrypted with an encryption/decryption 534. The link may be parsed via a parser 532 when a user sends the link. The token may be retrieved and accessibility to the private feed may be determined.

Additionally, computing system environment 500 may also have additional features/functionality. For example, computing system environment 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and nonremovable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 512 may allow computing system environment 500 to communication over various networks types including, but not limited to, Bluetooth, Ethernet, Wi-fi, Infrared Data Association (IrDA), Local area networks (LAN), Wireless Local area networks (WLAN), wide area networks (WAN) such as the internet serial, and universal serial bus (USB). It is appreciated the various network types that communication connection(s) 512 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 500 may also have input device(s) 514 such as a keyboard, mouse, pen, voice input device, touch input device, remote control, etc. Output device(s) 516 such as a display, speakers, etc. may also be included. All these devices are well known in the art and need not be discussed at length here.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of generating a link to access a private feed comprising:
   receiving a request to access the private feed;
   generating a token for a first user in response to the request when the first user is authorized to access the private feed, the token identifying the first user and the private feed;
   embedding the token in the link, the link configured to authorize a second user to access the private feed in response to receipt of an indication of activation of the link; and
   adapting data fed via the private feed based upon a social networking relationship between the first user and an owner of the private feed, at least some of at least one of the receiving, the generating, the embedding, or the adapting implemented at least in part via a processing unit.

2. The method of claim 1, comprising:
   transmitting the link to the first user.

3. The method of claim 1, the link compliant with a uniform resource locator (URL) format.

4. The method of claim 1, comprising:
   encrypting a portion of the token.

5. The method of claim 1, comprising:
   rendering the private feed inaccessible in response to receipt of an indication of the owner of the private feed revoking authorization of the first user.

6. The method of claim 1, the token generated based at least in part on a key that belongs to the owner of the private feed, the key configured to identify one or more users authorized to access the private feed.

7. The method of claim 6, comprising:
   rendering the private feed inaccessible in response to receipt of an indication of the owner of the private feed revoking authorization of the first user by altering the key.

8. The method of claim 1 comprising:
   providing the private feed to the second user in response to receipt of an indication of activation of the link by the second user.

9. The method of claim 1, the link identifying a format comprising at least one of really simple syndication (RSS) or ATOM.

10. The method of claim 1, the link configured to authorize the second user to access the private feed when an indication of activation of the link is received from at least one of a first device or a second device of the second user.

11. A method of providing access to a private feed to a second user, comprising:
    receiving a link comprising a request from the second user to access the private feed;
    accessing a token within the link, the token configured to identify the private feed and a first user authorized to access the private feed;
    based on the token, determining whether the first user is authorized to access the private feed; and
    if the first user is authorized to access the private feed, feeding content to the second user at a first time and restricting access to at least a portion of the content at a second time, via transmission of the private feed, based upon a social networking relationship between the first user and an owner of the private feed, the first time not the same as the second time, at least some of at least one of the receiving, the accessing, the determining, or the feeding implemented at least in part via a processing unit.

12. The method of claim 11, comprising:

not transmitting the private feed to the second user when the first user is not determined to be authorized to access the private feed.

13. The method of claim 11, comprising:

transmitting the private feed to the second user when the second user is not logged on to a service associated with the private feed, such that private data associated with the first user remains unavailable to the second user even though the second user has access to the private feed.

14. The method of claim 11, comprising:

accessing a key that belongs to the owner of the private feed; and determining whether the first user is authorized to access the private feed by determining whether indicators of one or more authorized users comprised within the key comprise an indicator of the first user.

15. The method of claim 11, comprising:

accessing a key associated with the owner of the private feed; and decrypting the token using the key.

16. The method of claim 11, the token encrypted at least in part.

17. A computer storage device having computer executable components for generating a pre-authorized link to provide a second device with access to a private feed, comprising:

a token generation module configured to generate a token for a first device requesting access to the private feed when the first device is determined to be authorized to access the private feed, the token configured to identify the first device and the private feed;

a uniform resource location (URL) generation module configured to generate a link comprising the token; and an authentication module configured to receive an indication of activation of the link from the second device and determine whether the first device is authorized to access the private feed.

18. The computer storage device of claim 17, comprising:

an authorization key module configured to store a key for an owner of the private feed, the authentication module configured to determine whether the first device is authorized to access the private feed based at least in part upon the token and the key.

19. The computer storage device of claim 17, the first device comprising a laptop, the second device comprising an electronic picture frame.

20. The computer storage device of claim 18, the key altered in response to the owner of the private feed revoking authorization of the first device to access the private feed to render the private feed inaccessible to at least one of the second device or the first device.

* * * * *